United States Patent [19]

Izumo et al.

[11] 4,307,518
[45] Dec. 29, 1981

[54] PROCESS FOR REMOVING WATER FROM SURFACES OF ARTICLES AND WATER REMOVING BATH FOR USE IN THE PROCESS

[75] Inventors: Masanori Izumo, Neyagawa; Kenichiro Omoto, Suita, both of Japan

[73] Assignee: Daikin Kogyo Kabushiki Kaisha, Japan

[21] Appl. No.: 133,263

[22] Filed: Mar. 24, 1980

[30] Foreign Application Priority Data

Mar. 31, 1979 [JP] Japan .................................. 54-39008

[51] Int. Cl.³ .............................................. F26B 3/00
[52] U.S. Cl. ...................................................... 34/9
[58] Field of Search ................................ 34/9; 252/194

[56] References Cited

U.S. PATENT DOCUMENTS 3,386,181 6/1968 Steinacker ................................ 34/9
3,710,450 1/1973 Figiel ........................................ 34/9
3,903,012 9/1975 Brandreth ........................... 252/194

FOREIGN PATENT DOCUMENTS 49-101955 9/1974 Japan.
49-36867 10/1974 Japan.

Primary Examiner—John J. Camby
Attorney, Agent, or Firm—Larson and Taylor

[57] ABSTRACT

This invention is characterized in the improvements of the process for removing water from the surfaces of articles with use of an apparatus having a dewatering tank and water separator which improvements comprise incorporating an evaporator into the conventional apparatus and using as a bath a mixture of trichlorotrifluoroethane and ethanol in specific proportions.

3 Claims, 7 Drawing Figures

PROCESS FOR REMOVING WATER FROM SURFACES OF ARTICLES AND WATER REMOVING BATH FOR USE IN THE PROCESS

This invention relates to a process for removing water from articles and to a water removing bath for use in this process.

Various plated articles, optical lenses, semiconductor materials, etc. must be washed with water after surface treatment and then dewatered rapidly and completely. For the removal of water from such articles, it is known to immerse the article in a non-aqueous liquid. Non-aqueous liquids useful for this purpose include chlorofluoro hydrocarbon liquids, among which trichlorotrifluoroethane is especially useful. It is low in surface tension, removes water more effectively than other non-aqeuous solvents, is chemically stable and nonflammable, has low toxicity and exhibits low corrosive properties on various materials, especially on plastics. However, this solvent itself still remains to be improved in dewatering effect. Accordingly, the solvent is used usually with a surfactant admixed therewith. It is used also in the form of an azeotropic mixture with a water-soluble liquid. The former mixture nevertheless has the serious drawback that the surfactant, which is nonvolatile, will partly remain on the surface of the dewatered article. Additionally the mixture has difficulties in completely removing water from minute cracks or cavities in the surfaces of articles. The latter mixture is free of the defect attributable to the use of surfactant and capable of fully dewatering articles without involving the above-mentioned difficulties. Published Examined Japanese Patent Application No. 36867/1974 and Published Unexamined Japanese Patent Application No. 101955/1974 disclose use of baths of the latter type prepared by mixing together a halogenated hydrocarbon, such as trichlorotrifluoroethane, and a water-soluble liquid, such as methanol, ethanol, isopropanol, acetone or the like, in such a ratio that will give an azeotrope. However, baths containing these water-soluble solvents have a problem. When the water removed from the surfaces of articles is separated from the bath, the water-soluble solvent is also separated along with the water, greatly reducing the concentration of solvent in the resulting bath and rendering the bath unusable as it is. Apparatus for removing water from articles with use of baths of this type usually consist essentially of a dewatering tank containing the bath for immersing the article for the removal of water, a water separator for receiving from the tank an overflow of the bath containing the water removed from the article, subjecting the bath to phase separation due to the difference in specific gravity and removing the aqueous upper phase through an overflow duct, and a device for returning the bath separated from water to the dewatering tank. When the bath contains a water-soluble solvent, the water separated from the article invariably contains the solvent as dissolved therein, with the result that not only water but the solvent which is a component of the bath is also separated from the bath in the water separator.

In order to overcome this problem, we have conducted continued research and found that the variation of the composition of the bath can be substantially eliminated by introducing the water separated in a water separator into a rectifying unit instead of discharging the water as it is, separating the water-soluble solvent from the water by rectification and returning the solvent to the dewatering tank or the water separator.

The research process and the process of the present invention will be discussed below with reference to the attached drawings herein:

Figure 1:
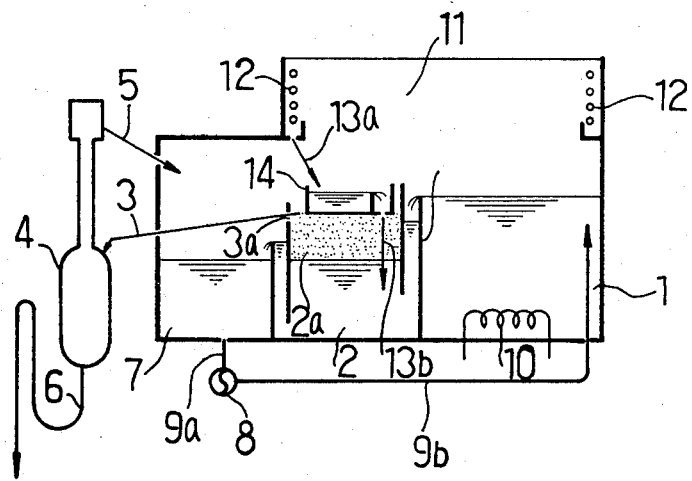
FIG. 1 is a diagram in vertical section showing an apparatus with which research has been conducted in attempts to provide an improved process for removing water from the surface of articles.

This process will be described below with reference to FIG. 1 which is a diagram in vertical section showing an apparatus useful for practicing the process. The articles to be dewatered are immersed in a dewatering tank 1 filled with a bath, in which water is removed from the surfaces of the articles. The water which has a smaller specific gravity than the bath rises and overflows a wall 1a into a water separator 2, in which the water contained in the bath also rises due to the difference in specific gravity to form an aqueous phase 2a. The water is run off from the separator 2 through an opening 3a and a discharge pipe 3 and led into a rectifying unit 4, in which it is subjected to rectification. The water-soluble solvent contained in the water as dissolved therein is separated therefrom in the rectifying unit 4 and returned via pipe 5 to the space above the dewatering tank 1 and the water separator 2 or to the liquid in these tank and separator, in the form of a vapor or liquid. The water separated from the solvent is run off through a drain pipe 6. The bath separated from water in the water separator 2 is temporarily held in a reservoir 7 and then returned to the dewatering tank 1 by a pump 8 by way of lines 9a and 9b. The dewatering tank 1 is equipped with a heater 10 by which the bath is heated to release a vapor. The vapor always fills the space 11 above the tank 1 and the water separator 2 communicating with the tank. The space 11 is thus filled with the vapor of the bath because the water separated from and floating on the bath in the water separator 2 contains a large quantity of the water-soluble solvent, is generally inflammable and involves a fire hazard, hence it is necessary to fill the space 11 with the nonflammable vapor of the bath. Since the space 11 is partly allowed to communicate with the atmosphere through an openable inlet for articles, a cooler 12 is provided in the path of communication to cool and liquefy the vapor and thereby prevent escape of the vapor to the atmosphere. The resulting liquefied bath is returned to the dewatering tank 1 or water separator 2. With the apparatus shown in FIG. 1, a return duct 13a extends to a liquid receptacle 14 disposed above the water separator 2 so that the vapor of bath released from the receptacle 14 will cover the aqueous phase 2a to effectively prevent a fire. The bath in the receptacle 14 is returned to the separator through a return pipe 13b.

Our research conducted on the above process with use of this apparatus has revealed the following.

Figure 2:
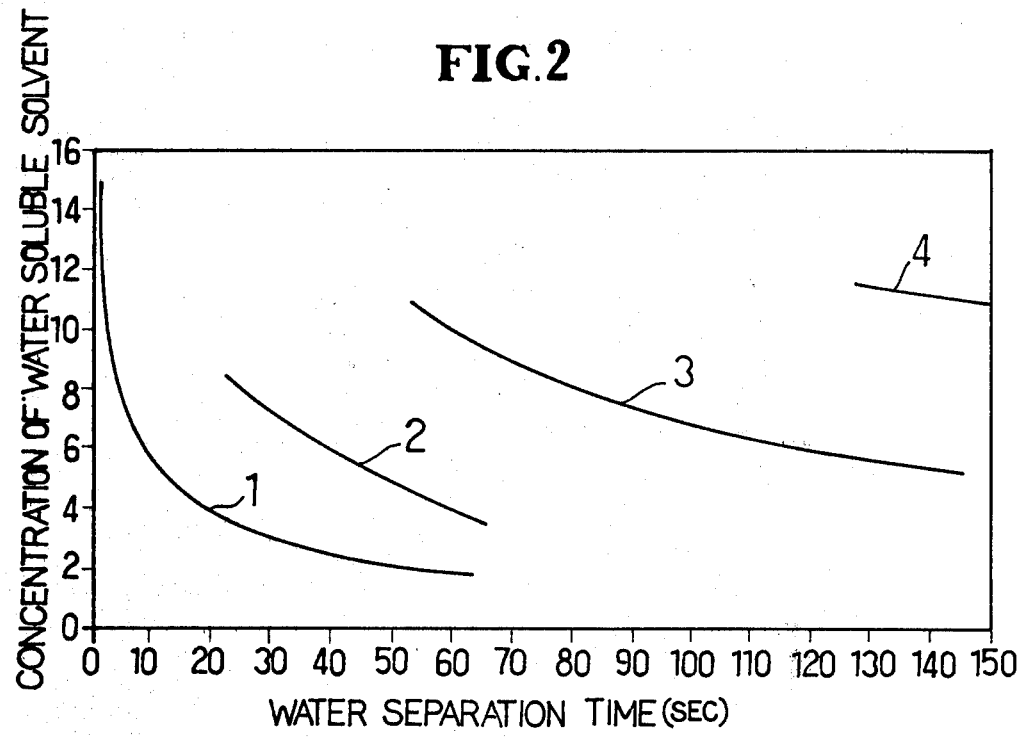
FIG. 2 is a graph showing the dewatering efficiencies of mixtures of trichlorotrifluoroethane with various water solvents obtained with use of the apparatus of FIG. 1.

Among water-soluble solvents conjointly usable with trichlorotrifluoroethane, ethanol is more superior than the others in dewatering performance. FIG. 2 shows the dewatering efficiencies of mixtures of trichlorotrifluoroethane with various water-soluble solvents. In FIG. 2, the concentration of the water-soluble solvent in trichlorotrifluoroethane is plotted as ordinate, vs. the water separation time (sec) as abscissa. Represented by (1) is a mixture of trichlorotrifluoroethane with ethanol, by (2) that with methanol, by (3) that with isopropanol, and by (4) that with acetone. The dewatering efficiency was measured by wetting a plating holder having a polyethylene lining (and comprising a bar and about 10 rods, attached to the bar in radial arrangement) with water, gently immersing the wet holder into the mixture contained in a container, and measuring the time taken for the water to remove from the surface of the holder. The mixtures were tested by this method at varying solvent concentrations. FIG. 2 shows that water is removable in a very short period of time with use of the ethanol-trichlorotrifluoroethane mixture having an ethanol concentration of not less than about 10% and that this mixture achieves a higher dewatering efficiency than any other mixtures tested.

A further description will be given of the dewatering treatment conducted with use of the most preferable bath, i.e. ethanol-trichlorotrifluoroethane, in the apparatus of FIG. 1. We found that there are problems that more or less quantity of the bath is released through the space 11 to the atmosphere and a little quantity of ethanol is also lost accompanied with drained water from the drain pipe (6) of the rectifying unit (4), which cannot be avoided. To cope with these problems, the quantity of bath released to the atmosphere through the space 11 must be compensated for by replenishing the apparatus with a fresh portion of bath, and the bath must always be replenished with ethanol at a rate corresponding to the quantity of ethanol drained with water. However, if the ethanol replenishment is lesser than the loss, the ethanol concentration of the bath will progressively decrease with the operating time, resulting in a reduced dewatering efficiency due to the change of the composition of the bath. Conversely if the supply of ethanol exceeds the loss, the bath will have a progressively increasing ethanol concentration which entails an increased fire hazard and gives rise to difficulties in practice. However, since the amount of water removed varies at all times during actual operation and consequently produces varying losses of ethanol, it is almost impossible to always measure such losses by analysis. Thus we have found it commercially almost infeasible to accurately replenish the bath with ethanol. For the replenishment of the bath with ethanol, therefore, there is a need to use a replenishment having a higher ethanol concentration than the bath in use.

Figure 3:
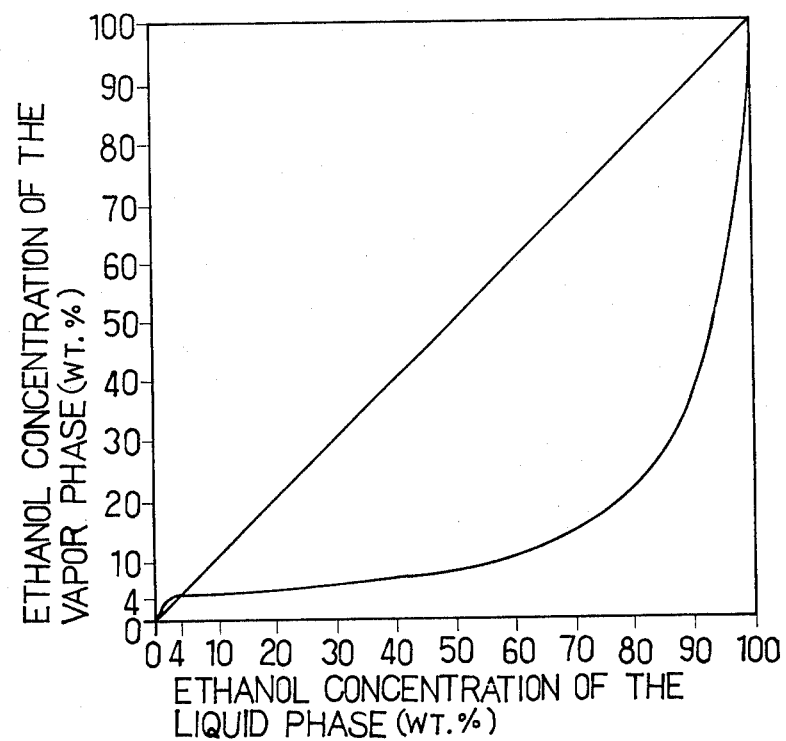
FIG. 3 is a graph showing the vapor-liquid equilibrium of trichlorofluoromethane-ethanol mixtures as expressed in terms of ethanol concentration.

FIG. 3 shows the vapor-liquid equilibrium of trichlorotrifluoroethane-ethanol mixtures as expressed in terms of ethanol concentration. In FIG. 3, the ethanol concentration of the vapor phase is plotted as ordinate, vs. the ethanol concentration (both in wt. %) of the liquid phase as abscissa. The figure shows that there is an azeotropic point at the ethanol concentration of 4%. It is especially noteworthy that the ethanol concentration of the vapor phase remains substantially constant at about 4% if the ethanol concentration of the liquid phase exceeds 4% and is not higher than about 50%.

When a bath of high ethanol concentration is used as a replenishment for a continued operation with the apparatus of FIG. 1, the vapor of the bath released from the dewatering tank 1 has an ethanol concentration of about 4% at all times, and the vapor having this concentration escapes through the space 11 into the atmosphere. Accordingly if the replenishing bath of high ethanol concentration is used to make up the loss of ethanol through the discharge of water, the bath in the dewatering tank will invariably have a progressively increasing ethanol concentration. Whereas the ethanol concentration of the vapor of the bath released to the atmosphere remains at about 4% at all times, the replenishment has a higher ethanol concentration, so that the ethanol in the dewatering tank will become concentrated. This gives rise to the objections that since the composition of the bath in the dewatering tank is not constantly maintained, it is impossible to remove water from the article invariably under constant conditions, and that when removing water from an article soiled with other substances, this results in the defilement of the whole portion of the bath as well as the bath in the dewatering tank.

An object of this invention is to provide a dewatering process having none of the foregoing drawbacks.

Another object of the invention is to provide a process for removing water from the surfaces of articles with use of a mixture of trichlorotrifluoroethane and ethanol having an ethanol concentration of higher than about 4% without entailing concentration of ethanol in the dewatering tank.

These and other objects and features of the invention will become apparent from the following description.

The present invention provides a process for removing water from the surfaces of articles with use of an apparatus having a water separating zone comprising a dewatering tank containing a bath composed of a water-insoluble organic liquid and a water-soluble organic solvent for immersing the article to remove water therefrom, and a water separator for separating the removed water from the bath by virtue of the difference in specific gravity, the dewatering tank and the separator being in communication with each other through a space provided thereabove which is partly allowed to communicate with the atmosphere, a cooler being disposed in the channel to the atmosphere for condensing vapor of the bath to return the condensed bath to the water separating zone, so that the water separated by the separator and containing the water-soluble solvent as dissolved therein is further separated into water and the solvent to return the solvent to the water separating zone, the process being characterized in that:

(1) the bath is a mixture of trichlorotrifluoroethane and ethanol having an ethanol concentration of 4.5 to 7.8 wt. %, (2) a portion of the bath separated from water by the separator is introduced into an evaporator for evaporating the bath included in the apparatus and having an upper space communicating with the space, and (3) replenishing at least one of the dewatering tank, the water separator and the evaporator with the mixture of trichlorotrifluoroethane and ethanol having an ethanol concentration of 4.5 to 7.8 wt. %.

The invention further provides a bath for removing water from the surfaces of articles for use in the above process, characterized in that the bath is a mixture of trichlorotrifluoroethane and ethanol and has an ethanol concentration of 4.5 to 7.8 wt. %.

The process of this invention will be described below with reference to FIG. 4 which is a diagram in section showing an apparatus suitably used for the present process. The parts shown in FIG. 4 with the reference numerals of 1 to 14 are the same as those shown in FIG. 1 with like reference numerals. The apparatus includes an evaporator 16 having an upper space communicating with the space above the dewatering tank 1 and water separator 2 and a heater 15 at its lower portion. The bath separated from water is returned to the evaporator 16 through a return pipe 17. With use of the apparatus of FIG. 4, water is removed from articles by a process which comprises the process to be performed by the apparatus of FIG. 1 and further involves the return of the bath from the reservoir 7 (which is used when required) to the evaporator 16 through the pipe 17 and evaporation of the bath by the evaporator. With this process, even when the apparatus is replenished with a bath having a slightly higher ethanol concentration of 4.5 to 7.8 wt. %, the ethanol will be concentrated only in the evaporator. The ethanol concentration of the vapor of bath produced in the evaporator varies with the ethanol concentration of the liquid phase along the vapor-liquid equilibrium curve shown in FIG. 3. It is seen that even if the liquid phase has an increased ethanol concentration, for example, of about 50%, the ethanol concentration of the evolved vapor is as low as about 7.8%. Since the liquid resulting from the vapor and having the same concentration as the vapor is supplied to the dewatering zone, the treating bath will in no way have an abnormally increased concentration. The ethanol is not highly concentrated in the evaporator if a fresh bath containing ethanol 4.5 to 7.8 wt. % in concentration is replenished. Even if ethanol is highly concentrated, it is easy to control the concentration of the bath because the maximum concentration of 50% is allowable.

According to the present invention, at least one of the dewatering tank, water separator, and if required, reservoir evaporator is replenished with a fresh bath. The replenishment must have an azeotropic composition, namely, an ethanol concentration of at least 4.0 wt. %. Further in view of the quantity of ethanol to be discharged with water, the ethanol concentration should be at least 4.5 wt. %, preferably at least 5.0 wt. %. Since the vapor of bath exceeding about 8.0 wt. % in ethanol concentration tends to be inflammable, the replenishment should have an ethanol concentration of up to 7.8 wt. %, preferably up to 6.5 wt. %. When water is removed from articles by the process of this invention with use of the apparatus of FIG. 4, the amount of bath decreases with the lapse of time due to the discharge of ethanol with drain water and release of vapor to the atmosphere. The apparatus can be replenished with the bath in a suitable amount at a proper time easily with reference to the liquid level in the evaporator and/or reservoir.

As stated above, it is preferable but not essential to incorporate a reservoir in the apparatus. With the apparatus of this invention, preferably the dewatering tank, water separator and evaporator share the space lying above them and communicating with the atmosphere outside the apparatus, as shown in FIG. 4. The apparatus may be arranged such that the space above them is divided into separate portions.

Figure 5:
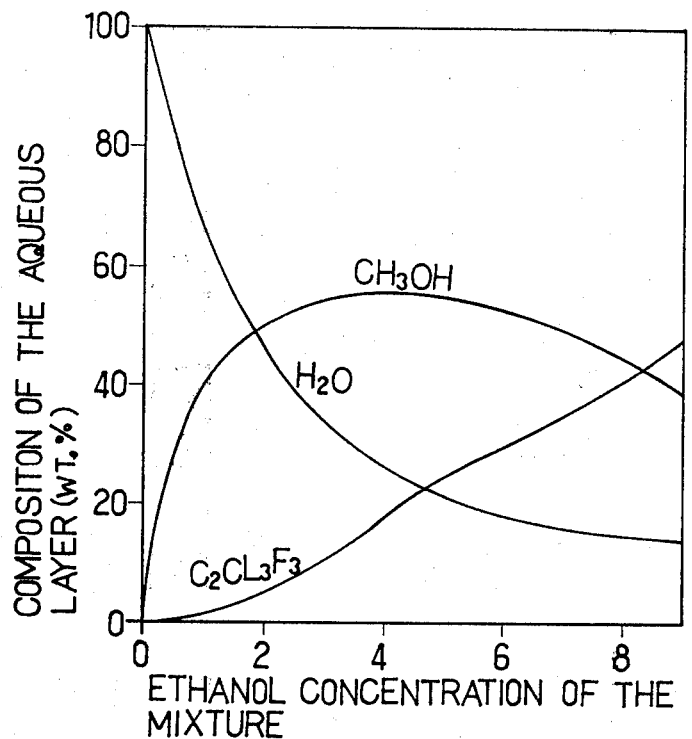
FIG. 5 is a graph showing the results of an experiment conducted to substantiate that water is removable from articles with greater ease when the ethanol concentration of the bath is increased.
Figure 6:
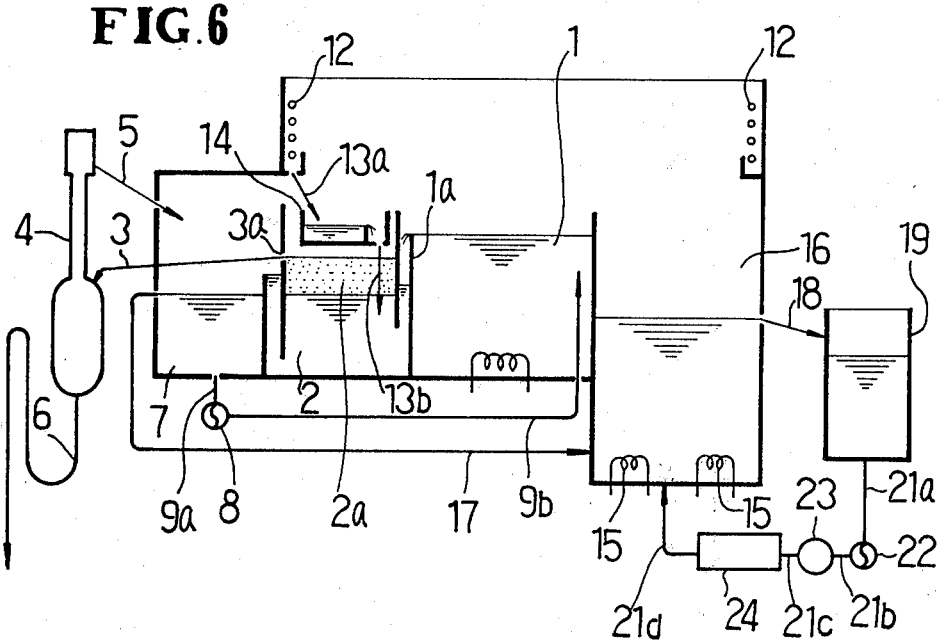
FIG. 6 is a vertical section of an apparatus suitable for use in carrying out another embodiment of this invention.
Figure 7:
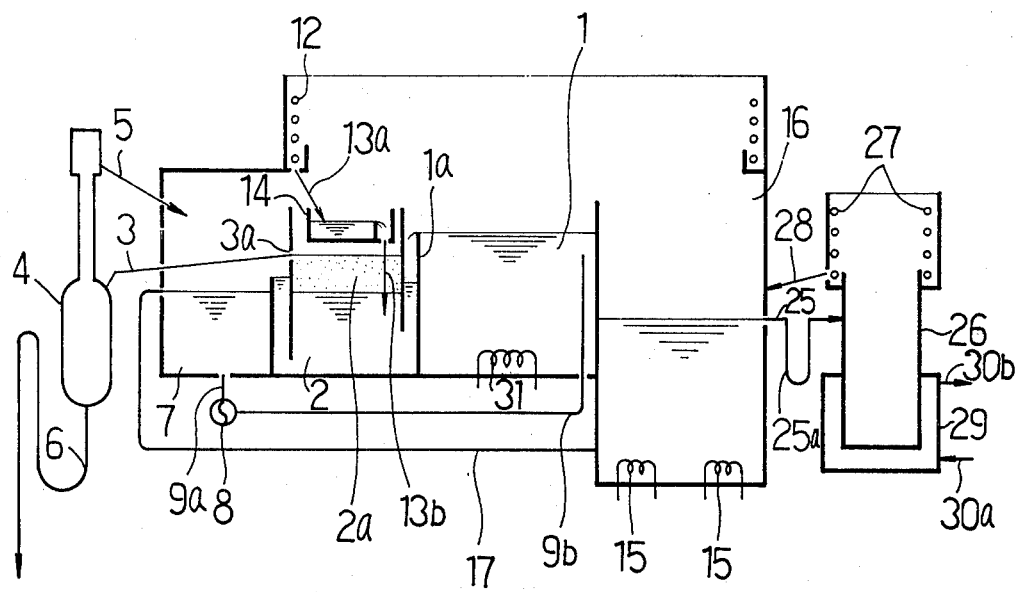
FIG. 7 is a vertical section of an apparatus suitable for carrying out yet another embodiment of the invention.

When the apparatus is operated continuously, the ethanol concentration of the bath becomes higher in the evaporator 16 than in the dewatering tank 1. Generally water is removable from articles with greater ease with an increase in the ethanol concentration. To substantiate this, an experiment was conducted by admixing water to a mixture of trichlorotrifluoroethane and ethanol with stirring, allowing the mixture to stand to separate the mixture into two layers, and collecting the aqueous upper layer. The composition of the aqueous layer was then determined. The same procedure was repeated with use of starting mixtures having varying ethanol concentrations. The results are shown in FIG. 5 in which the composition of the aqueous layer is plotted as ordinate, vs. the ethanol concentration of the mixture tested as abscissa. FIG. 5 reveals that when the ethanol concentration of the mixture varies merely from 4% to 8%, the quantity of water in the separated aqueous layer decreases with a great increase in the concentration of trichlorofluoroethane in the aqueous layer. This means that when an article is immersed in such a mixture and then withdrawn, the quantity of mixture wetting and deposited on the article will not vary substantially, then the quantity of water in the deposit is much smaller when the mixture has an ethanol concentration of 8% than when having an ethanol concentration of 4%. Since electrolytes, colloidal substances and like pollutants are present chiefly in water, the surface of the article, when thereafter dried, is much cleaner in the former case (8% ethanol) than in the latter case (4% ethanol). It therefore follows that when the articles immersed in the dewatering bath are thereafter immersed in the bath contained in the evaporator and having a higher ethanol concentration, the articles can be dried more perfectly with improved cleanness. In fact, articles, such as lenses and semiconductor wafers, which require a sophisticated drying and cleaning procedure, will not always be fully dewatered when merely immersed in the dewatering bath. These articles should be finished with the evaporator bath. However, when the evaporator bath is utilized also for finishing, small amounts of soils adhering to the articles will accumulate in the evaporator bath, with the likelihood of recontaminating articles. FIGS. 6 and 7 show apparatus in which this problem has been overcome.

The evaporator 16 shown in FIG. 6 serves also as a dewatering tank for rinsing or finishing. The bath from the reservoir 7 is led through a return pipe 17 into the evaporator 16, in which it is heated and evaporated as is the case with the apparatus of FIG. 4. The bath in the evaporator 16 is withdrawn through a pipe 18 and stored in a tank 19, from which the bath is returned to the evaporator 16 through pipes 21a, 21b, 21c and 21d and by a pump 22. The channel 21 is provided with a dryer 23 filled with a water absorbing material, such as zeolite or silica gel, and a filter 24 for removing soils such as colloids and high-boiling substances. These tank 19, dryer 23 and filter 24 are combined to serve as means for purifying the bath in the evaporator.

FIG. 7 shows an apparatus equipped with a different purifying unit. The bath in the evaporator is led through a pipe 25 into an instantaneous evaporator 26, in which the bath is instantaneously evaporated. The resulting vapor is condensed by a cooler 27 to a liquid, which is returned to the evaporator 16 via a pipe 28. The pipe 25 includes a depending portion 25a. The lower half of the instantaneous evaporator 26 is surrounded by a heater 29 to which a heat medium is fed through a pipe 30a. The medium is run off via a pipe 30b. The lower half of the evaporator 26 must be heated to such a high temperature that the bath supplied thereto will be evaporated instantaneously. The bath is purified by being thus evaporated into a clean vapor. The dewatering tanks 1 shown in FIGS. 6 and 7 are provided with a heater 31, by which the bath is heated to a temperature lower than the boiling point of the bath.

The evaporator used in the present invention primarily serves to control the concentration of the bath as already described and also performs some other important functions. While articles should be brought into the dewatering tank after having been thoroughly washed with pure water, and such a care will be taken in practice, but soils other than water are still very likely to remain on the surfaces of the articles despite the precautions taken. Such soils dissolve or disperse in the bath in the dewatering tank and accumulate in the evaporator but will not be transferred to some other location. Consequently the evaporator serves to lodge the soils. The evaporator performs another function of generating a concentrated vapor of the bath since the bath therein is maintained by the heater at a high temperature, preferably in a boiling state, at all times during operation. The articles immersed in the dewatering bath, when thereafter allowed to stand in the vapor generated in the evaporator, can be finished as desired since the vapor provides a bath of the highest purity. In the absence of the evaporator as shown in FIG. 1, there is the need to boil the bath in the dewatering tank, but the drops of water once removed from the surfaces of articles will then be stirred and dispersed through the whole bath by boiling, with the resulting likelihood that the removed water will deposit on the article again immediately before it is withdrawn from the bath.

EXAMPLE

Figure 4:
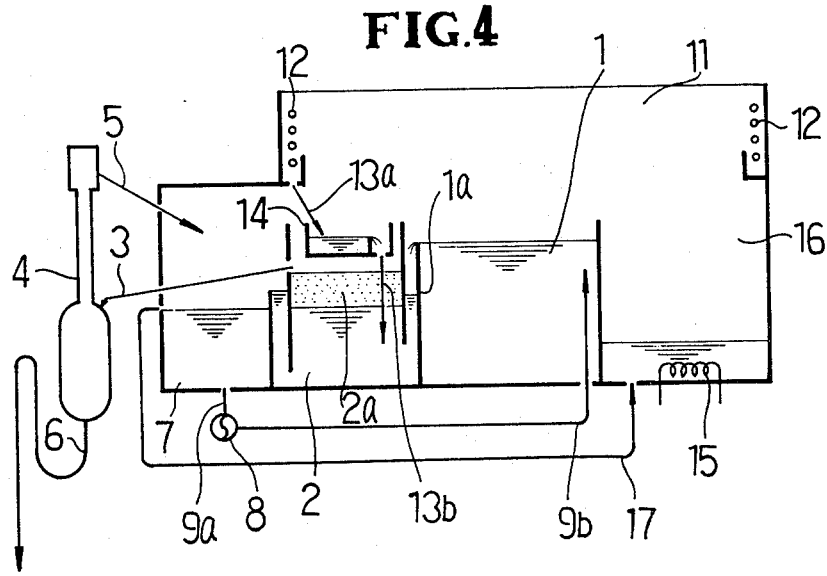
FIG. 4 is a diagram in vertical section of another apparatus suitable for use in the practice of the present invention.

Small-sized finned heat exchangers washed with water are dewatered with use of the apparatus of FIG. 4. The dewatering tank 1 is 250 mm in width and length and 250 mm in height and is equipped with a 200-W ultrasonic generator (frequency 28 KHz) on its bottom. The water separator 2, 100 mm in width, 250 mm in length and 150 mm in height, has attached thereto a water discharge pipe 3 ⅜ inch in diameter and having a 75-cm-long upright portion 6a extending upward from the bottom of the rectifying unit 4. The rectifying unit 4 has installed therein a 500-W electric heater and a thermometer which are positioned at a level lower than one-half of the height of its interior. The heater and the thermometer are coupled to an unillustrated temperature control device to control the interior temperature of the unit 4.

A mixture of trichlorotrifluoroethane and ethanol in the ratio by weight of 94:6 is used as the bath. The heat exchangers, washed with water, are immersed in the bath in the dewatering tank one after another. By the immersion of the heat exchangers, water is introduced into the dewatering tank at a rate of 1 liter/hr, and water is removed from the articles at the same rate to completely dewater the articles. The water separated from and floating on the bath in the water separator 2 contains 53% of ethanol. The bath separated from the water is returned to the dewatering tank 1 from the reservoir 7 at a rate of 20 liters/min. The water containing ethanol is fed to the rectifying unit 4 adjusted to a temperature of 95° C. The ethanol flowing out from a condenser at an upper portion of the unit 4 is returned to the reservoir 7.

While operating the apparatus under the foregoing conditions, the apparatus is replenished with a fresh mixture of the same composition as above if the liquid level in the evaporator drops below a specified level indicated by a level gauge attached to the evaporator to maintain the bath at the specified level. About one hour after the start of the operation, the bath is found to have the following compositions in the dewatering zone and in the evaporation zone. The bath thereafter retains the same compositions.

| Zone | Trichlorotrifluoroethane (wt. %) | Ethanol (wt. %) |
| --- | --- | --- |
| Dewatering | 95.5 | 4.5 |
| Evaporation | 89.7 | 11.3 |

Water is continuously drawn off from the unit 4 through the drain pipe 6. The water contains about 5 wt. % of ethanol.

We claim:

1. In a process for removing water from the surfaces of articles by immersing the articles into the bath of an apparatus having a water separating zone comprising a dewatering tank containing said bath, said bath being comprised of a water-insoluble organic liquid and a water-soluble organic solvent, separating the removed water from the bath in a water separator by virtue of the difference in specific gravity, the dewatering tank and the separator being in communication with each other through a space provided thereabove which is partly allowed to communicate with the atmosphere, condensing vapor of the bath in the channel in a cooler disposed in the channel to the atmosphere, returning the condensed bath to the water separating zone, and further separating the water separated by the water separator and containing the water-soluble solvent as dissolved therein into water and the solvent and returning the solvent to the water separating zone, the improvement wherein:

(1) the bath is a mixture of trichlorotrifluoroethane and ethanol,
    (2) a portion of the bath separated from water by the water separator is introduced into an evaporator for evaporating the bath included in the apparatus and having an upper space communicating with the space, and
    (3) replenishing at least one of the dewatering tank, the water separator and the evaporator with the mixture of trichlorotrifluoroethane and ethanol having an ethanol concentration of 4.5 to 7.8 wt.%.

2. A process for removing water from the surfaces of articles according to claim 1 wherein the apparatus has a reservoir for storing an overflow of the bath separated from the water in the water separator.

3. A process for removing water from the surfaces of articles according to claim 1 which further includes the steps of withdrawing from the evaporator part of the bath defiled in the dewatering tank with an article having a soiled surface, removing the soil from the bath and returning the bath to the evaporator for use in rewash of the above articles.

* * * * *